Figure 1:
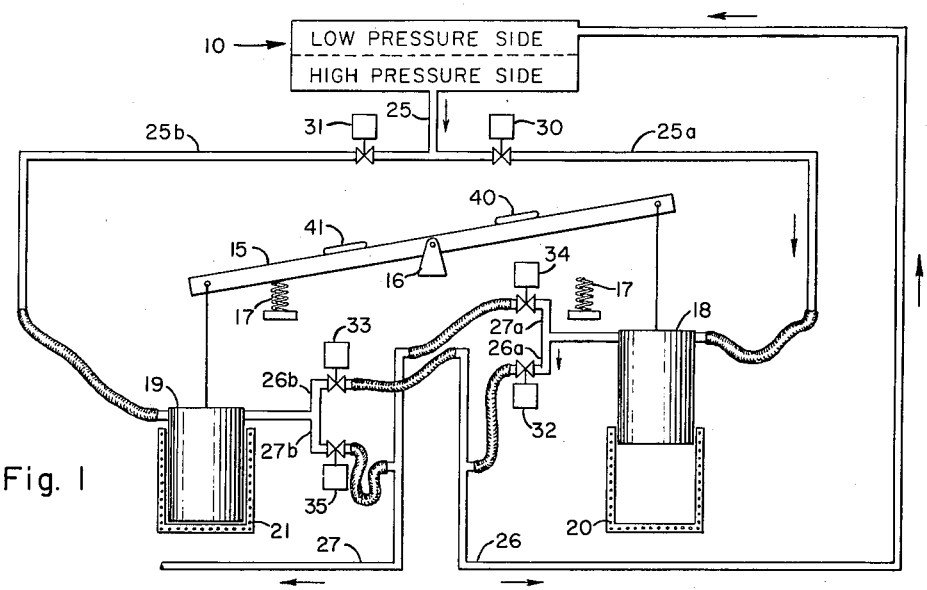

Oct. 3, 1961

H. E. CASWELL 3,002,360

WATER PURGE FOR REFRIGERATION SYSTEMS

Filed March 3, 1958

INVENTOR.
HOWARD E. CASWELL
BY
*Herman Seid*
ATTORNEY

United States Patent Office 3,002,360
Patented Oct. 3, 1961

3,002,360
WATER PURGE FOR REFRIGERATION SYSTEMS
Howard E. Caswell, East Syracuse, N.Y., assignor to Carrier Corporation, Syracuse, N.Y., a corporation of Delaware
Filed Mar. 3, 1958, Ser. No. 718,803
2 Claims. (Cl. 62—160)

This invention relates to refrigeration systems, more particularly, to means for the removal of water which may have leaked into water chilling refrigeration systems.

In water chilling refrigeration systems in which high pressure refrigerants are employed, the chances of air leakage are relatively nil, since any leaks in the sealed refrigeration system result in an egress of the high pressure refrigerant, rather than an ingress of air. However, slight leaks in the water piping of the cooler and condenser may occur during use with the result that some minor amount of water enters the refrigeration system and mixes with the refrigerant. The presence of water in the system tends to increase corrosion of the components of the system.

It is accordingly a primary object of this invention to provide improved water removal means for a high pressure refrigeration system.

Another object of this invention is to provide means for the removal of water from a refrigeration system, with said means functioning continuously and automatically.

A further object of this invention is to provide means permitting the removal of any water from the refrigerant of a refrigeration system with a minimal loss of refrigerant.

A still further object is to provide a novel method for removing water from a refrigeration system.

These and other objects of the invention, which will become apparent from the following specification and claims, are achieved by feeding the refrigerant employed in the system, preferably, when said refrigerant is in the gaseous state, such as in the high pressure portion of the system, alternatively through one of two unconnected vessels containing selective water absorbent material such as silica gel, alumina, etc. The vessels are mounted on a beam fulcrumed so that the weight of one vessel acts to counter-balance the weight of the other. Each of the vessels is further arranged so that it may be acted on by a heating element to bake out any water absorbed in said vessel. The entire means is arranged so that each vessel functions alternatively to remove water from the gaseous refrigerant, or to permit baking out of any water absorbed.

A primary feature of the invention resides in the arrangement of a water absorbent material in a refrigeration system, through which gaseous refrigerant of the refrigeration system may be passed, with said water absorbent material being immediately replaceable by another water absorbent material upon saturation of said first material, whereby the refrigerant is continuously subjected to water removal.

Another important feature of the invention resides in the provision of means for automatically drying or "baking out" any water absorbed by a water absorbent material employed for the removal of water from a refrigeration system.

Figure 2:
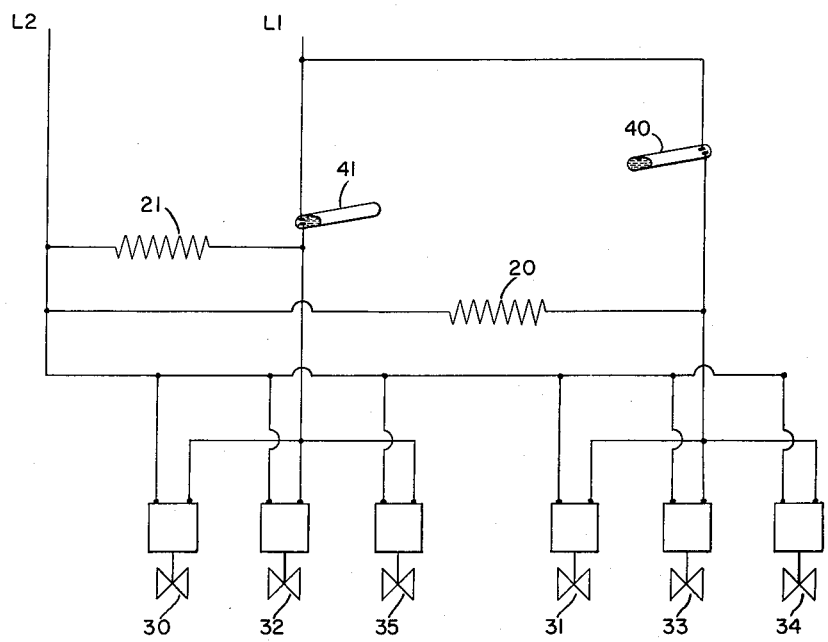

A specific embodiment of this invention, and its mode of functioning, will be made most manifest and particularly pointed out, in conjunction with the accompanying drawing, wherein:

FIGURE 1 is a schematic view of a water removal portion of a refrigeration system, with the components shown diagrammatically; and FIGURE 2 is a schematic wiring diagram illustrating how the solenoid switches are employed to effect desired operation.

Referring now more particularly to the drawings, as shown by block diagram in the schematic illustration of FIGURE 1, a refrigeration system 10 is provided with the herein disclosed novel water removal means.

These water removal means comprise in the preferred embodiment of the invention as shown schematically in FIGURE 1, a lever 15 fulcrumed at its center about the fulcrum 16, and limited in its movement by schematically illustrated spring members 17.

Supported at each end of lever 15 are closed vessels 18 and 19 respectively, with said vessels balancing each other. Within the vessels is a selective water absorbent material such as silica gel, alumina, etc. The vessels 18 and 19 are arranged to move into and out of effective range of heating elements 20 and 21 respectively. The heating elements here shown are of an electric type, but may obviously be of any one of a variety of other forms. Thus, for example, the hot discharge gases of the refrigeration system 10 may be employed for heating elements 20 and 21 by passing a portion of this hot discharge gas through coils arranged in conjunction with said vessels.

Each vessel is connected to the high pressure portion of refrigeration system 10 from which water is to be removed, by means of refrigerant gas line 25. Refrigerant gas line 25 has a first branch 25a, and a second branch 25b leading respectively to closed vessels 18 and 19. Restrictions, preferably, are placed in these lines to prevent flooding of the vessels. Refrigerant gas return line 26 connects first branch return line 26a and second branch return line 26b extending respectively from vessels 18 and 19, to the refrigeration system 10. Preferably, restrictions are also placed in these lines. An atmospheric line 27 leads from branch lines 27a and 27b extending respectively from vessels 18 and 19 to the atmosphere. It will be observed that the connections between these lines and the vessels are flexible so as to permit movement of the vessels. In each of the aforementioned branch lines are solenoid actuated gas supply valves 30 and 31 respectively; solenoid actuated gas return valves 32 and 33 respectively; and solenoid actuated water discharge valves 34 and 35 respectively. The solenoid valves here shown are of the type in which the valve is normally closed, and is opened when the solenoid is actuated.

Each of the aforementioned solenoid actuated valves is controlled as best seen in FIGURE 2. As shown schematically in FIGURE 2, a switch member 40 controls the supply of current to solenoid actuated valves 31, 33 and 34; and a second switch member 41 controls the flow of current to solenoid actuated valves 30, 32 and 35. The switch members 40 and 41 are arranged in combination with lever 15, so that when one switch member is open, the other closed, and vice versa, depending on the position of lever 15. This can readily be accomplished by means of conventional mercury-tilt switches located on the lever. Thus, when one of the switch members is closed (switch 41, as illustrated), then the associated solenoid valves (30, 32 and 35 as illustrated) are energized and open; while the other switch member (40 as illustrated) will be open and the associated solenoid valves (31, 33 and 34, as illustrated) are closed. Where heaters 20 and 21 are of an electrical type, they may be arranged for control by switch members 40 and 41 respectively, so that when switch member 40 is open, the circuit to heater 20 will be open, and similarly when switch member 41 is open, the circuit to heater 21 will be open. Where heaters 20 and 21 are heated by means of the refrigerant discharge gas passing through coils in said heating elements, solenoid valves of the aforementioned type may be employed to control the flow of gas to said coils. The solenoids of said valves are arranged to be energized by switches 40 and 41 with flow of discharge gas taking place only when a vessel is in "baking out" position.

Operation

The novel water removal means here disclosed are arranged in combination with a refrigeration system, more especially a high pressure water chilling refrigeration system, so as to remove any water which may have leaked into the system. The novel means are so arranged with respect to the system that the refrigerant, when said refrigerant is in the gaseous state, is passed in contact with a water absorbent material which absorbs water, but does not absorb any appreciable amount of the refrigerant, thereby reducing refrigerant loss in the water removal process to a minimum.

As viewed in the drawing, water absorption means in vessel 18, which, as here noted, comprises a water absorbent material such as silica gel, alumina, etc., is shown in operative position for water removal or desiccation of the refrigerant; whereas alternatively employable water absorption means in vessel 19 is shown in the drying out or "baking" position. With the water absorbent means in vessel 18 in the operative water removal position, lever 15 is oriented, as seen with the water absorbing material in vessel 18, raised by the counter-weight action of the saturated water absorbent material in vessel 19. With vessel 18 in its upper water absorbing position, switch member 40 is open and switch member 41 is closed. This results in refrigerant gas supply valve 30 being open, and gas supply valve 31 closed; gas return valve 32 is open and gas return valve 33 is closed; while atmospheric valve 35 is open, and atmospheric valve 34 is closed. With the valves in this position, gaseous refrigerant from the refrigeration system passes through valve 30 into vessel 18, into contact with the water absorbent material therein, and thence the desiccated gas is returned to the refrigeration system through open refrigerant gas return valve 32.

At the same time, the water saturated vessel 19, which is in the down position, is in effective range of heating element 21, so as to cause a "baking out" of the water contained therein. Atmospheric valve 35 is open, permitting discharge of the "baked out" water vapor to the atmosphere.

When vessel 19 has had sufficient moisture "baked out" of the water absorbent material therein so as to lighten vessel 19 with respect to the water absorbing vessel 18, vessel 19 is counterbalanced by vessel 18, thereby bringing vessel 19 into water absorbing position, and vessel 18 into "baking out" position. When this reorientation of the vessels takes place, switch member 40 will be closed, and switch member 41 opened, whereby refrigerant gas supply valve 31 will be opened, simultaneously closing refrigerant gas supply valve 30; refrigerant gas return valve 33 will be opened simultaneously closing refrigerant gas return valve 32; and atmospheric valve 35 will be closed simultaneously opening atmospheric return valve 34. The refrigerant gas will now flow through valve 31, vessel 19 and valve 33, while vessel 18 will be "baked out" with the water vapor released to the atmosphere through valve 34.

This cycle operates continuously during the operation of the refrigeration system, so that refrigerant gas is continously passed through a water absorbent material to remove the water from said gas, with little or no removal, or loss of any refrigerant.

The above disclosure has been given by way of illustation and elucidation, and not by way of limitation, and it is desired to protect all embodiments of the herein disclosed inventive concept within the scope of the appended claims.

I claim:

1. Apparatus for removing moisture from a refrigerating system comprising a first vessel having moisture absorption material disposed therein, a second vessel having moisture absorption material disposed therein, heater means associated with each vessel, conduit means connecting each vessel with the system so that refrigerant may flow from the system through one of said vessels and return to the system, valve means controlling flow in said conduit means, a control circuit for said apparatus operative to actuate said valve means to automatically establish refrigerant flow from the system selectively to one of said vessels while energizing the heater associated with the other vessel and means responsive to a predetermined relation between the amount of moisture in the respective vessels, regulating operation of said control circuit.

2. The invention set forth in claim 1 wherein said last mentioned means includes a pivotally mounted lever, each end of which is connected to one of the two vessels and switch elements carried by said lever.

References Cited in the file of this patent
UNITED STATES PATENTS

| | | |
|---|---|---|
| 1,939,695 | Hasche | Dec. 19, 1933 |
| 1,945,407 | Adair | Jan. 30, 1934 |
| 2,278,854 | Hunsicker | Apr. 7, 1942 |
| 2,863,299 | Amons | Dec. 9, 1958 |